United States Patent [11] 3,542,303

[72] Inventor Samuel H. Auld
Newport Beach, California
[21] Appl. No. 659,183
[22] Filed Aug. 8, 1967
[45] Patented Nov. 24, 1970
[73] Assignee Lear Jet Industries, Inc.
Wichita, Kansas
a corporation of Delaware

[54] PINCH MEMBER FOR MAGNETIC TAPE TRANSPORT
12 Claims, 10 Drawing Figs.

[52] U.S. Cl. ........ 242/55.19; 226/183, 226/199; 242/197
[51] Int. Cl. ........ B65h 17/48, B65h 23/32; G03b 1/50
[50] Field of Search ........ 242/55.13, 55.19, 76; 226/183, 196, 198, 199, 168; 179/100.2

[56] References Cited
UNITED STATES PATENTS

| | | | |
|---|---|---|---|
| 3,032,613 | 5/1962 | Namenyi-Katz | 179/100.2 |
| 3,289,963 | 12/1966 | Taylor et al. | 242/55.19 |
| 3,289,906 | 12/1966 | Schueller | 226/168 |
| 3,424,360 | 1/1969 | Trott | 226/168 |

*Primary Examiner*—Leonard D. Christian
*Attorney*—Richard A. Marsen

ABSTRACT: The conventional pinch roller or tire is herein replaced by a member that does not rotate in the function of pressing magnetic tape against a drive capstan in its record or play-back operation. One embodiment fits onto the post of the roller it replaces. It automatically adjusts to the capstan, and has inherent high lubricity for smooth tape transport with very low "wow" or flutter. Other embodiments have the same characteristics, one being with an elastic mounting.

Patented Nov. 24, 1970 3,542,303

INVENTOR,

SAMUEL H. AULD

BY Richard A. Marsen his ATTORNEY

INVENTOR,
SAMUEL H. AULD
BY
Richard A. Marsen
his ATTORNEY

PINCH MEMBER FOR MAGNETIC TAPE TRANSPORT

This invention relates to magnetic tape drive systems, and more particularly relates to novel pinch members for maintaining the tape pressed against its capstan drive for longitudinal transport.

It has heretofore been the practice to utilize a roller or tire to pinch or press magnetic tape against the capstan to transport it across the transducer head. For quality results the roller had to be carefully made and mounted to avoid eccentric components that cause "wow" and flutter in the sound reproduction. Eventual wear of the roller inevitably deteriorated transcription therewith.

In accordance with the present invention, a nonrotating pinch member is provided that is arranged to press and hold the tape in drive relation with its capstan. The pinch member hereof presents a highly lubricious surface to the back of the magnetic tape, that permits its smooth longitudinal transport by the capstan. The preferred tape is graphite and/or silicone coated on its pressed side, in current conventional usage. The preferred pinch unit of the invention is mounted and constructed to automatically adjust and align with the particular capstan orientation, and thereby effect the tape transport with negligible drag and minimal "wow" or flutter imperfections. In fact, typical pinch members of the invention have been found to transport the tape with resultant sound reproduction containing less than one-tenth such imperfections than that by pinch rollers in the same system.

The novel nonrotatable pinch members hereof can be molded directly from thermoplastic material, by automatic machinery. Their cost is less than half that of the pinch rollers or tires they replace. Their life-cycle can be made to exceed that of rollers; and also impart no deleterious residue to harm the magnetic tape or the player elements. In a preferred pinch member construction, it can be merely inserted on the bearing post of a conventional pinch roller, and so effect direct replacement thereof. The resultant economy, effectiveness, and improved quality of the invention members are particularly important in mass-produced magnetic tape cartridges, particularly for the popular priced market.

The aforesaid and further features, advantages and objects of the present invention will become more apparent from the following description of exemplary embodiments thereof, illustrated in the accompanying drawings, in which.

Figure 1:
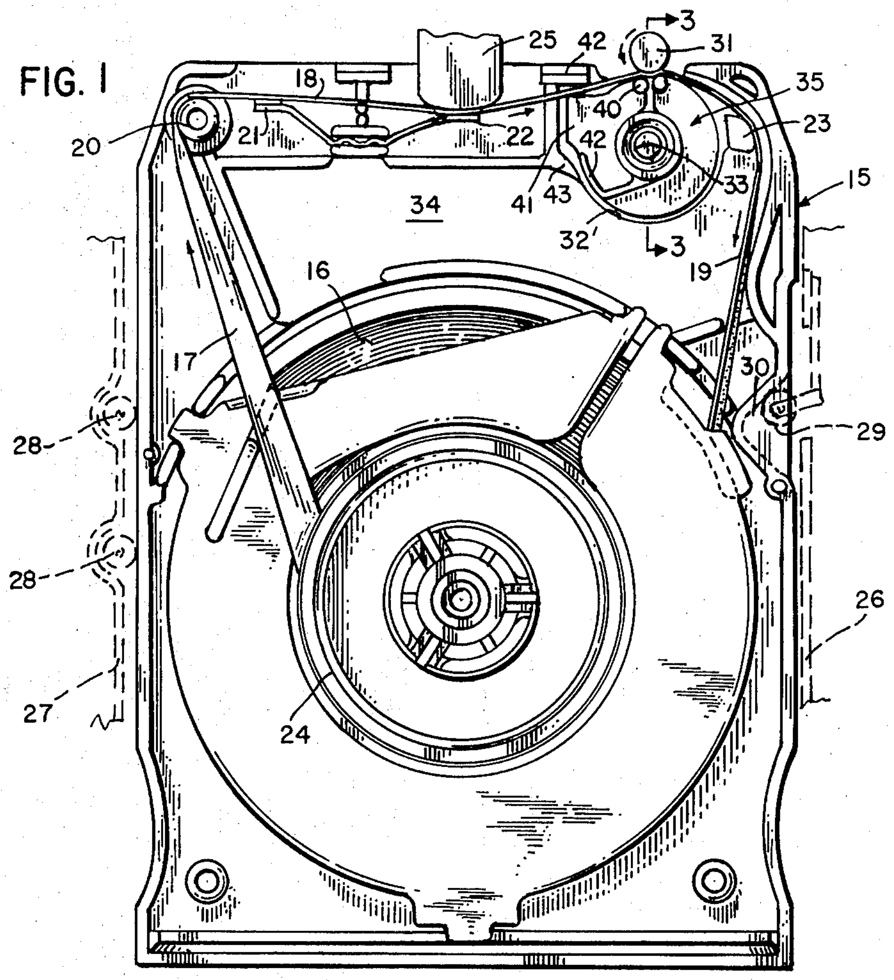
FIG. 1 is a plan view of a magnetic tape cartridge with its cover removed, showing an exemplary pinch member in operative position therein.

Cartridge 15 contains a reel 16 of magnetic tape in endless array with a loop 17, 18, 19 of the tape threaded about guide post 20, springs 21, 22, pinch member 35 and guide element 23. Loop portion 17 extends from the inner turn of the reel 16 at the periphery of central hub 24. The transverse loop portion 18 of the tape is biased into coaction with transducer head 25 when the cartridge 15 is held engaged in the player or recorder. Such engagement is effected by inserting the cartridge in an opening with sides 26, 27 indicated by dashed lines. Rollers 28, 28 facilitate cartridge insertion.

A retention roller 29 is biased into engagement with the inclined surface 30 of a notched region in a side of the cartridge. A forward force is thereby provided, pressing pinch member 35 against capstan 31, with an adjacent segment of the magnetic tape loop therebetween. Capstan 31 is driven to rotate counterclockwise, as indicated by the dashed line arrow, wherein the tape is transported across head 25 from left to right in FIG. 1, per the arrows thereat. Pinch member 35 serves the function of a conventionally used pinch roller in the same position, pressing the tape against the rotating capstan 31 that engages and drives the tape in the usual manner.

Figure 2:
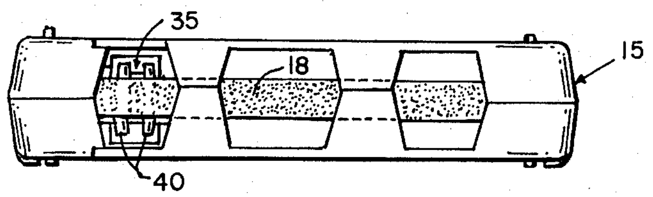
FIG. 2 is an elevational view, at the exposed tape end, showing the pinch member and the tape.

The pinch member 35 is applicable in other cartridge constructions than illustratively shown in FIGS. 1 and 2. Thus, further details of the cartridge 15 and tape operation are not presented herein. Reference is made to my U.S. Pat. No. 3,482,792 of Dec. 9, 1969 for "Endless Tape Cartridge", and assigned to same assignee. The tape pinch means of the present invention is useful and applicable in magnetic tape cartridges generally instead of a contained pinch roller, or in reel-to-reel systems in place of a built-in pinch roller. The advantages in the use of the invention nonrotatable pinch member include economy, better quality of sound reproduction, and cleaner tape play.

Figure 3:
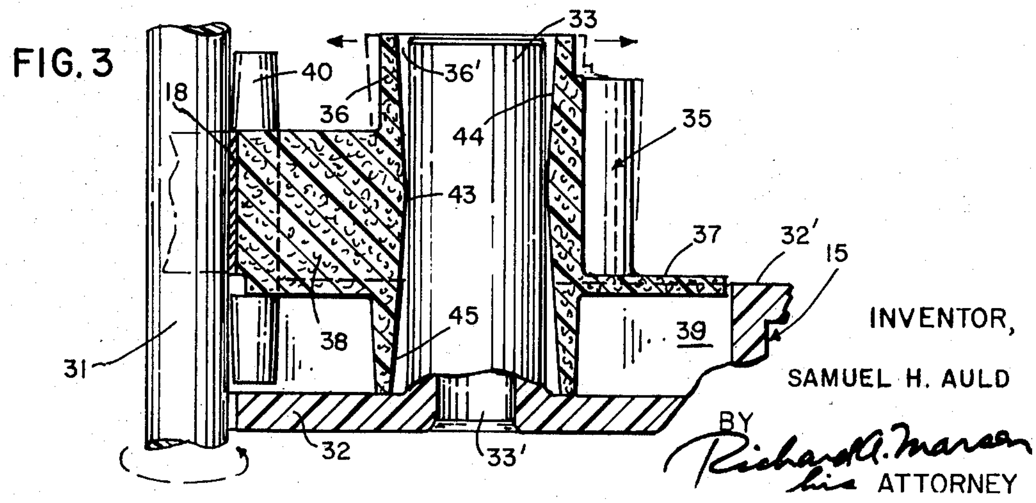
FIG. 3 is an enlarged cross-sectional view through the exemplary pinch member of FIG. 1, taken along the line 3–3 thereof.

The pinch member 35 is formed with a central cylinder 36 having an opening 36' that is positioned over the post 33 of the cartridge, see FIGS. 1 and 3. Post 33 is molded integrally with the base portion 32, with an interior hole 33'. A raised platform 32' forms a chamber region 34 within which surplus tape portions are temporarily stored, as described in the aforesaid patent application. A substantially circular shelf or platform 37 extends from member at the level of auxiliary base 32', as seen in FIG. 3. Shelf 37 prevents tape from falling below base 32' into the well 39 under it in which a pinch roller otherwise would fit if used.

Two parallel spaced vertical rods 40, 40 are formed in member 35 at a peripheral region of shelf 37 whereat the capstan 31 coacts. A solid rib 38 extends radially from cylinder 36 to parallel rods 40,40, and molded integrally together to mechanically mount them. The height of rib 38 corresponds to the width of the tape 18, as seen in FIGS. 2 and 3. Rods 40,40 extend on both sides of rib 38, being almost as high as cylinder 36.

Figure 4:
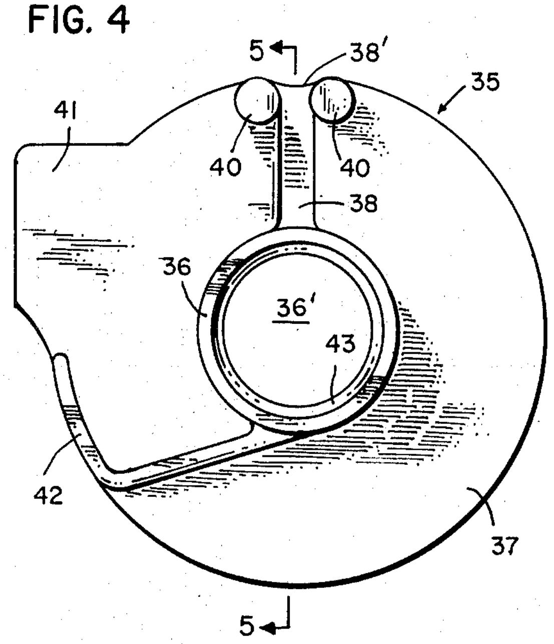
FIG. 4 is an enlarged plan view of the exemplary member of FIG. 1.
Figure 5:
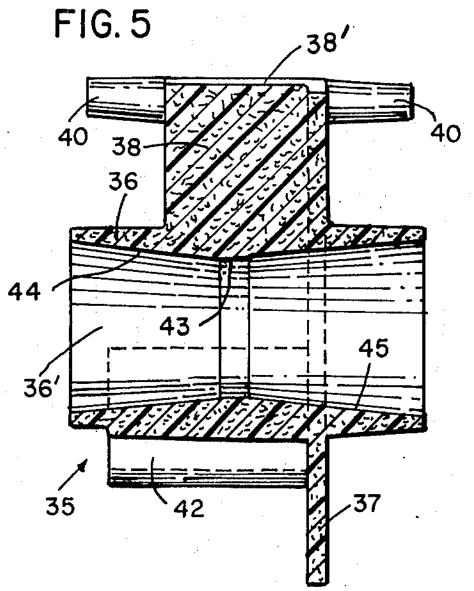
FIG. 5 is a cross-sectional view through the member taken along the line 5–5 of FIG. 4.
Figure 6:
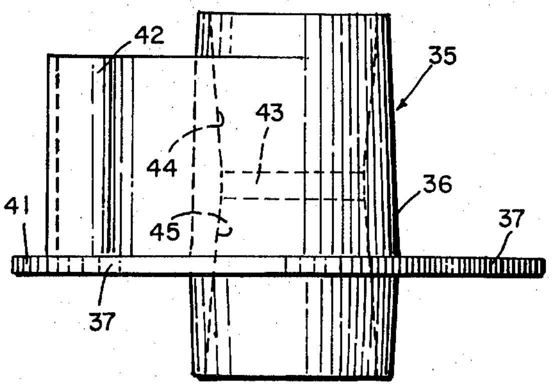
FIGS. 6 and 7 are respective side and front elevational views of the exemplary pinch member of FIG. 4.
Figure 7:
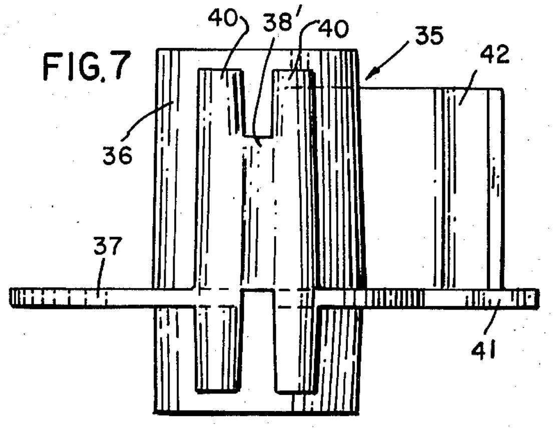

Shelf 37 has an extended ear configuration 41 shaped to abut fixed portion 42 of the cartridge or portion 43 in the other direction, see FIG. 1. Ear 41 thus prevents rotation of pinch member 35 when set into the pocket of the cartridge 15 that could accommodate a pinch roller instead. Member 35 has a further element, namely a wing or arm 42 formed above shelf 37, extending outwardly to its periphery and then partially along it (see FIGS. 1 and 4). Arm 42 prevents tape that backs up into surplus chamber 34 for takeup, to spillover beyond the chamber thereat.

The peripheral portion 38' of rib 38 that lies between rods 40,40 is made concave to conform with the surface of capstan 31 when in coaction therewith across the tape 18, see FIGS. 1 and 3. Such concave surface 38' is coextensive with the tape width, affording a full and substantial contact surface for pressing the tape 18 against the capstan 31, with full contact. The adjacent parallel rods 40,40 serve to directly align the loosely mounted pinch member 35 with the particular capstan 31 of the player, wherein the concave contact surface 38' is promptly positioned for accurate coaction in transporting the tape by uniform pressure against the capstan.

An important feature of pinch member 35 is freedom to mechanically adjust its position or articulate with respect to the capstan drive. This is accomplished by its mounting in the cartridge with its various dimensions sufficiently clear of adjacent cartridge portions to permit its articulation to engage with Capstans in somewhat off-vertical or offcenter locations in players that the cartridge may be used. In this aspect member 35 adjusts to practicably coact with a capstan, over wider off-ranges than could a single-mounted pinch roller. The central cylinder 36 of member 35 has only its central region 43 close to the diameter of mounting post 33, and its interior walls 44,45 taper outwardly with increasing diameter.

Pinch member 35 thus, when not engaged, is free to wobble on its post 33, yet when in coaction with a capstan is held in firm coaction, in true alinement with the capstan. Its mechanical adjustment is accomplished through the alining rods 40,40 as aforesaid, with the dimensional freedom in its mounting on post 33 as well as that of its shelf 37 and ear 41 in the cartridge pocket. Once engaged against the rotating capstan, the concave surface 38′ provides a smooth lubricious contact pressure against the back of the magnetic tape 18 thereat, and in turn against the capstan 31.

The pinch member 35 is preferably machine molded as a solid unitary piece of tough self-lubricating material. Its solid construction affords predetermined smooth uniform tape transport inducing minimum signal distortions. Further, with suitable composition thereof, no ruboff or fouling of the transported tape would occur, and relatively long-life and stability of both tape and pinch member results. Towards this end, the composition sold by the Du Pont Company under the Trademark "Delrin AF" is very suitable. Delrin AF is a thermoplastic material consisting of fluorocarbon fibers dispersed uniformly in acetal resin. The resin is a polymerized formaldehyde or polyoxymethylene, and the fluorocarbon is the "Teflon" compound of Du Pont, a polytetrafluroethylene. Teflon is a very slippery or lubricious material. Fibers thereof are arranged in a matrix of the stronger, tougher, plastic of the Delrin acetal resin, to form the said Delrin AF.

The pinch member 35 is readily commercially molded of the Delrin AF composition, is easily machineable if necessary; is tough and mechanically and operationally stable. Its wear at contact surface 38′ is the order of 0.010 inch for 500 hours of operation, of negligible order. It is found to provide excellent tape pressure stably, *e.g.* at a 5 pound forward force provided on the cartridge 15 by retention roller 29. A typical tape length for the reel 16 is in the range of 200 feet to 400 feet. Cost of member 35 is found to be less than half of that of an equivalent rubber tired pinch roller for the cartridge 15. Other lubricious material may be used to form the pinch member 35. For example, Teflon itself, in solid form may be utilized. While somewhat cheaper than Delrin AF, it wears faster, and thus would have a lower effective life cycle.

Figure 8:
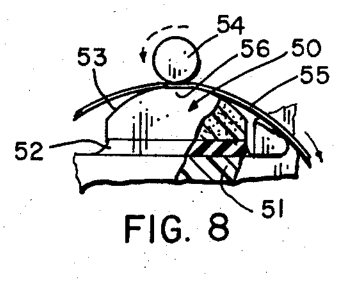
FIGS. 8, 9 and 10 are illustrations of respective modified versions of the pinch member of the present invention.

A modified pinch member or block 50 is illustrated in FIG. 8. The block 50 is mounted in the player or a cartridge 51, being cemented to a resilient strip 52. Strip 52 may be 0.100 inch thick, of rubber with a durometer of 60. Block 50 has good lubricity, being of Teflon or Delrin AF, as aforesaid. The top or exposed surface 53 of block 50 is arcuate in form to serve as a guide for the magnetic tape 55. The top central region 56 of block 50 is arranged opposite the capstan 54, and presses the tape 55 thereagainst. The transverse width of block 50 is at least that of tape 55. Block 50 preferably has a semicircular recess centrally at 56 to conform with the adjacent capstan surface. This affords a positive alignment of the block 50 with a particular capstan 54. The rubber base 52 provides a compliant characteristic to the assembly, whereby the block 50 readily articulates or alines with the capstan to laterally transport the tape in the play mode. Should block 50 be made wider than tape 55, its portions in direct contact with the capstan directly wear so that the tape transport is not interfered with.

Figure 9:
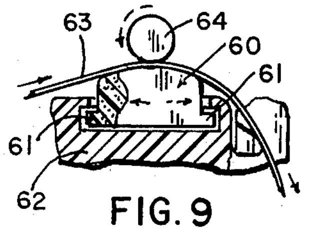

FIG. 9 shows a further embodiment of the present invention. Pinch block 60, of lubricious material has an arcuate top surface and central recess like block 50. Block 60 on the other hand is loosely mounted in a shaped cavity in the cartridge 62. The sides 61, 61 of block 60 extend into the cavity, as a mounting means. The cartridge cover and base hold block 60 therein. Block 60 articulates for ready alinement and steady engagement with the tape 63 and capstan 64. Pinch block 60 is thus arranged to simply be slipped into its cartridge cavity during assembly, yet is firm and stable in the tape play mode.

Figure 10:
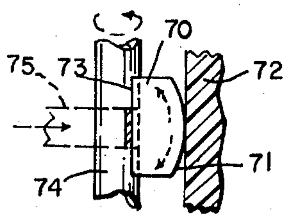

FIG. 10 illustrates a further manner of pinch block articulation. The back surface 71 of block 70 is in arcuate form, and in contact with a flat surface 72 of the cartridge. The front surface 73 of the block is directly coactable with the capstan 74, with tape 75 therebetween across a central section thereof. A relatively wide surface connection is effected by block 70 with capstan 74. A curved contact is provided to enhance direct and proper alinement between block and capstan. The rear curvature at 71 of block 70 insures constant alinement for the tape transport action.

Although the present invention has been described with exemplary embodiments and application, it is to be understood that variations and modifications thereof may be made within the broader spirit and scope of the invention, as set forth in the following claims.

I claim:

1. In a magnetic tape system containing a transducer head and a drive capstan, a reel of magnetic tape, and a pinch member supported for engaging the tape with said capstan for its longitudinal transport across the transducer head, said pinch member having a smooth surface portion of lubricious material and concave shape to maintain continual pressure on the adjacent tape portion and the capstan therewith for the tape transport, means for holding said surface portion near its operative position with the capstan, and means associated with said pinch member for establishing the direct alinement of said surface portion with the capstan during the said tape transport operation, said alinement means comprising a pair of spaced elements arranged across said surface portion and projecting beyond it in substantial parallel relation with the capstan.

2. A cartridge having a reel of magnetic tape in endless array with a tape loop extending adjacent an opening in the cartridge at one end thereof, and a pinch member supported in the cartridge adjacent its said opening and a portion of the tape loop for engaging the tape with a drive capstan for its longitudinal transport across the transducer head, said pinch member having a smooth surface portion of lubricious material and concave shape to maintain continual pressure on the adjacent tape portion and the capstan therewith for the tape transport, means for holding said surface portion near its operative position with the capstan, and means associated with said pinch member for establishing the direct alinement of said surface portion with the capstan during the said tape transport operation, said means for alinement comprising a pair of spaced elements arranged across said surface portion and projecting beyond it in substantial parallel relation with the capstan.

3. A magnetic tape system as claimed claim 1, in which said pinch member has a central cylinder with an opening for mounting the member on a stationary post, interior walls of the cylinder opening being wider than the central diameter thereof to permit articulation of the member on the post in its said alining action with the capstan.

4. A cartridge as claimed in claim 2, in which said pinch member has a central cylinder with an opening for mounting the member on a stationary post in the cartridge, interior walls of the cylinder opening being wider than the central diameter thereof to permit articulation of the member on the post in its said alining action with the capstan.

5. A cartridge as claimed in claim 4, further including a platform extending intermediate of said pinch member and substantially perpendicular to its said surface portion and projecting elements.

6. A cartridge as claimed in claim 4, in which said projecting elements are rod-shaped.

7. A cartridge as claimed in claim 2, further including means projecting from said pinch member for holding already played tape from reentering the tape transport region of the cartridge.

8. A cartridge as claimed in claim 5, further including means projecting from said pinch member for holding already played tape from reentering the tape transport region of the cartridge.

9. A pinch member for a magnetic tape system for pressing the tape against a drive capstan to longitudinally transport it in play operation comprising a smooth surface portion of lubricious material and concave shape to maintain continual pressure on the adjacent tape and the capstan therewith for the tape transport, and means associated with the member for establishing the direct alinement of said surface portion with the capstan during the said tape transport operation, said alinement means comprising a pair of spaced elements arranged across said surface portion and projecting beyond it in substantial parallel relation with the capstan.

10. A pinch member as claimed in claim 9, further including a central cylinder with an opening for mounting the member on a stationary post, interior walls of the cylinder opening being wider than the central diameter thereof to permit articulation of the member on the post in its said alining action with the capstan.

11. A pinch member as claimed in claim 10, further including a platform extending intermediate of said pinch member and substantially perpendicular to its said surface portion and projecting elements, said projecting elements being rod-shaped.

12. A pinch member as claimed in claim 11, further including means projecting from said pinch member for holding already played tape from reentering the tape transport region.